Patented Oct. 1, 1929

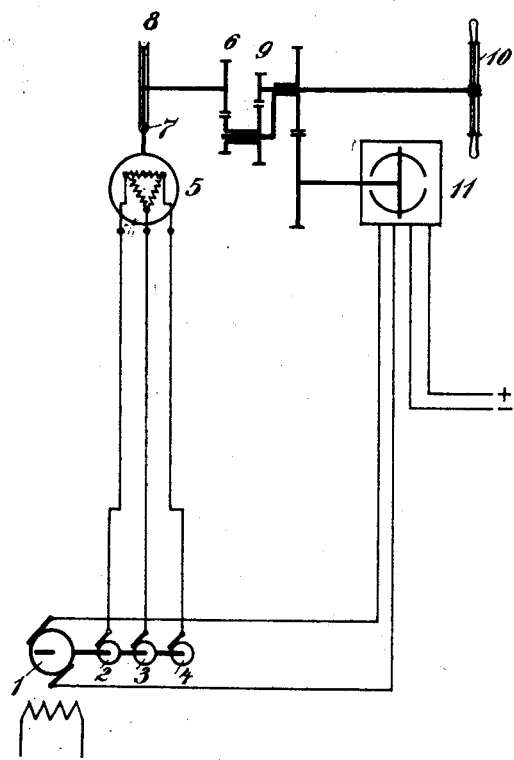

1,729,869

UNITED STATES PATENT OFFICE

ROBERT ELSÄSSER, OF BERLIN-CHARLOTTENBURG, GERMANY, ASSIGNOR, BY MESNE ASSIGNMENTS, TO WESTINGHOUSE ELECTRIC & MANUFACTURING COMPANY, A CORPORATION OF PENNSYLVANIA

ELECTRIC STEERING GEAR FOR SHIPS

Application filed October 11, 1924, Serial No. 743,092, and in Germany May 2, 1924.

My invention relates to improvements in electric steering-gear for ships.

In electric rudder plants frequently the task is set to bring the rudder motor starter which is switched in on the navigating-bridge by means of the steering hand-wheel under the influence of the rotation of the rudder motor back into the zero position. It is known to employ for this reverse rotation special reversing motors the operating current for which is only generated by the rotation of the rudder motor. For this purpose a special generator may be driven by the rudder motor or alternating current may be withdrawn from the rotor of the rudder motor by means of slip rings. When employing continuous current for these reversing motors complicated synchronizing devices are required and alternating current synchronous motors have therefore been employed. The synchronous motor fed by the rudder motor generally starts in this case because the rotation of the rudder motor rises from zero. Since, however, the synchronous motor has a low torque at low speeds the danger arises that the speed of the rudder motor increases quicker than the reversing motor is able to follow. The synchronous motor stops in this case and the synchronism between the rudder motor and the reversing motor aimed at is then lost altogether.

To overcome this drawback an asynchronous motor is according to my invention employed for the reverse rotation which motor also receives its current from the rudder motor. Such an asynchronous motor does not accurately observe the speed of the rudder motor at the start and lags behind a little according to its load but it cannot fall out of step or stop altogether like the synchronous motor. This is an essential advantage.

It is, furthermore, possible by suitably designing the motor to bring about a synchronous run after the termination of the starting period by known means, for instance by providing distinct poles upon the rotor, so that the motor then works as synchronous motor.

In the drawing affixed to my specification 1 is the rudder motor which is represented as shunt motor with uniformly excited shunt field which, however, could equally well be a series or compound motor. By means of the three slip rings 2, 3, 4 three-phase current is withdrawn from the rotor and passed to the asynchronous motor 5. This motor now drives approximately synchronously with the main motor one side of the differential gearing 6 by way of the worm 7 and the worm-wheel 8 while the other side 9 of the differential gearing is rotated by the steering hand-wheel 10. The difference of both movements is utilized to cut in or out the reversing starter 11 for the rudder motor. In order that the starter should maintain its position the hand-wheel 10 must be turned with a speed which corresponds with the speed of the rudder motor. Owing to the approximately synchronous transmission of the motion between the rudder motor and the differential gearing it is ensured that an approximately predetermined number of revolutions at the hand-wheel always corresponds with a certain path of the rudder.

Instead of feeding the rudder motor by a reversing starter directly from the network with constant voltage it may equally well be driven in known manner in Leonard connection. The place of the reversing starter is then taken by the reversing shunt regulator of the Leonard generator.

What I claim is:—

1. In an electric rudder drive, the combination with a driving motor and a hand-wheel, of a dynamo-electric machine disposed to receive power from said driving motor, a differential gear device having parts respectively driven by said machine and said hand-wheel, and means actuated by the differential gear device for controlling the operation of the driving motor.

2. In an electric rudder drive, the combination with a driving motor and a hand-wheel, of a dynamo-electric machine driven by said driving motor, a differential gear device having parts respectively driven by said machine and said hand-wheel, and control means for said machine governed by said device.

3. In an electric rudder drive, the combination with a driving motor and a hand-wheel, of an auxiliary motor electrically driven by said driving motor, a differential device having elements respectively driven by said auxiliary motor and said hand-wheel, and reversing means for said driving motor governed by said device.

4. In an electric rudder drive, the combination with a driving motor provided with slip-rings, of an alternating-current motor energized from said slip-rings, a differential device having elements respectively driven by said alternating-current motor and said hand-wheel, and control means for said driving motor governed by an element of said device.

5. In a ship steering system, in combination, a rudder-actuating motor, said motor being provided with slip rings for furnishing alternating-current power, a source of power for the motor, a controller for starting and stopping the motor, means operable to actuate the controller to initiate the operation of the rudder motor, and means interposed between said controller-actuating means and the motor for returning the controller to the off position to stop the motor, said means comprising a differential device connected to the controller and an alternating-current motor receiving power from the rudder motor for actuating the differential device.

6. In an electric rudder drive, in combination, a rudder-actuating motor, a source of power for the motor, a starter for connecting the motor to the source of power, a differential device disposed to control the operation of the motor starter, said differential device having a plurality of controlled elements, a hand wheel disposed to control one of said elements to initiate the operation of the motor and an auxiliary motor for controlling another of said elements to effect the stopping of the rudder motor, said auxiliary motor being disposed to operate from power generated by the rudder motor, whereby substantially synchronous operation is obtained between the rudder and auxiliary motors.

7. In an electric rudder drive, in combination, a rudder-actuating motor, a source of power for the motor, a starter for connecting the motor to the source of power, a differential device disposed to control the operation of the motor starter, said differential device having a plurality of controlled elements, a hand wheel disposed to control one of said elements to initiate the operation of the motor, and an auxiliary motor for controlling another of said elements to effect the stopping of the rudder motor, said rudder motor being provided with slip rings for energizing the auxiliary motor, thereby to effect a reverse operation of the starter to stop the operation of the rudder motor within a predeterimned number of revolutions depending upon the position to which the starter was actuated.

8. In an electric rudder drive, in combination, a rudder-actuating motor, a source of power for the motor, a starter for connecting the motor to the source of power, means for controlling the operation of the starter, said means comprising a differential device provided with a plurality of controlled elements and an element operatively connected to the starter, a hand wheel disposed to govern the operation of one of said controlled elements, and an auxiliary motor disposed to govern the operation of another of said controlled elements, said rudder motor being provided with slip rings for furnishing alternating-current power to the auxiliary motor to effect a predetermined movement of the starter in a direction to arrest the movement of the rudder-actuating motor.

In testimony whereof I affix my signature.

ROBERT ELSÄSSER.